(12) United States Patent
Friedrich et al.

(10) Patent No.: US 6,253,423 B1
(45) Date of Patent: Jul. 3, 2001

(54) FIXING ELEMENT

(75) Inventors: Elvira Friedrich, Hofheim; Otto Demel, Heidelberg; Markus Senftleber, Ketsch; Andreas Detloff, Walldorf, all of (DE)

(73) Assignee: Mecano Rapid GmbH, Heidelberg (DE)

( * ) Notice: Subject to any disclaimer, the term of this patent is extended or adjusted under 35 U.S.C. 154(b) by 0 days.

(21) Appl. No.: 09/355,696

(22) PCT Filed: Jan. 28, 1998

(86) PCT No.: PCT/DE98/00258

§ 371 Date: Oct. 28, 1999

§ 102(e) Date: Oct. 28, 1999

(87) PCT Pub. No.: WO98/33679

PCT Pub. Date: Aug. 6, 1998

(30) Foreign Application Priority Data

Jan. 31, 1997 (DE) ............................................. 197 03 491

(51) Int. Cl.$^7$ ...................................................... F16B 5/12
(52) U.S. Cl. ................................................. 24/293; 24/289
(58) Field of Search .............................. 24/289, 293, 295, 24/297, 453; 411/508, 509, 510

(56) References Cited

U.S. PATENT DOCUMENTS

| | | | |
|---|---|---|---|
| 2,574,330 | * | 11/1951 | Judd . |
| 3,310,929 | * | 3/1967 | Garvey . |
| 4,103,400 | * | 8/1978 | Munse . |
| 4,402,118 | * | 9/1983 | Benedetti . |
| 4,644,612 | * | 2/1987 | Osterland . |
| 5,058,356 | | 10/1991 | Yamamoto et al. . |
| 5,195,793 | | 3/1993 | Maki . |
| 5,533,237 | * | 7/1996 | Higgins . |
| 5,689,863 | * | 11/1997 | Sinozaki . |
| 5,704,753 | * | 1/1998 | Ueno . |
| 5,720,586 | * | 2/1998 | Kawaguchi . |
| 5,730,401 | * | 3/1998 | Takeda et al. . |
| 5,966,782 | * | 10/1999 | Ishihara et al. . |

FOREIGN PATENT DOCUMENTS

| | | |
|---|---|---|
| 3621772 | 1/1988 | (DE) . |
| 29519375 | 3/1996 | (DE) . |
| 0627564 | 7/1994 | (EP) . |
| 2262564 | 6/1993 | (GB) . |

* cited by examiner

Primary Examiner—James R. Brittain
(74) Attorney, Agent, or Firm—Milde, Hoffberg & Macklin, LLP

(57) ABSTRACT

The invention relates to a fixing element for connecting component parts, in particular plastic paneling, to sheet-metal, in particular parts of the chassis of a motor vehicle. Said fixing element comprises a plastic body which has a base configured for insertion into a U-shaped retaining element of the component part, and a head which, when assembled, projects through an opening in the metal sheet and carries latch springs which form an acute angle in relation to the longitudinal axis of the plastic body and, when assembled, lock behind the edges of the opening in the metal sheet.

12 Claims, 2 Drawing Sheets

FIXING ELEMENT

BACKGROUND OF THE INVENTION

The invention relates to an attachment device for connecting plastic parts, particularly linings, to sheets, especially body components of a motor vehicle. It consists of a plastic body with a foot part for insertion into a hoop-shaped holder of the plastic part, and a head part, which, when assembled, projects through an opening in the sheet.

The British Patent No. GB 2,262,564 proposes a one-piece plastic injection-molded attachment device in which there are arrayed locking pieces that project at the periphery for locking in a circular hole. Following one-time assembly, though, the part can be loosened when damaged, owing to its configuration, and therefore cannot be used repeatedly.

The U.S. Pat. No. 5,058,356 describes an attachment device which serves to attach decorative components. In this part, a lockable metal spring in the component to be attached is p laced on a T-girder-shaped shaft. However, the part is quite expensive to manufacture.

Such attachment devices should connect a hole in the structural part and an essentially aligned hole in the sheet to each other in locking fashion, so that the connection can be made during assembly by applying pressure on the structural part. Additionally, disassembly must be possible by pulling off the structural part without destroying the attachment device or the sheet. The aim is to ensure that the attachment device is not visible on the outer side of the structural part. To accomplish this, often holders which are injection-molded in the form of a flat hoop, bear the hole to admit the attachment device.

The objective of the present invention is to provide an attachment device which meets the above-mentioned requirements and ensures a secure attachment with a long service life.

This objective is achieved according to the invention by placing on the head piece a metal clamp adjoining the head piece, both of whose arms form a stop spring which forms an acute angle to the longitudinal axis of the plastic body. When assembled, the stop springs push back the edges of the opening in the sheet. The head piece has projections which push back parts bent inward of the metal clamp's arms on the side of the head piece that faces the foot piece.

In addition to making possible a reliable attachment, the attachment device according to the invention allows simple assembly of the attachment device in the structural part, as well as of the structural part with the attached attachment device on the sheet. In particular, the attachment device according to the invention ensures that, through fixing of the position of the attachment device vis-a-vis that surface of the structural piece which comes into direct contact with the sheet during assembly, the sheet piece will become securely engaged. At the same time, the attachment device according to the invention provides support of the attachment device within the structural part, so that pressure is applied without deformation of the structural part on the attachment device during assembly.

One advantageous embodiment shape of the invention consists in having the head piece sit atop a narrower middle piece while forming the projections.

This embodiment shape is preferably further configured by having the head piece shaped essentially as a half cylinder, with its shell surrounding the plastic body and forming a contact surface for the metal clamp. This causes the holding force to be transferred from the sheet via the stop springs to the head piece.

To better balance the tolerances, provision is preferably made to have the bends of the arms and the head piece configured so that the metal clamp is swivel-supported on the head piece. However, this applies only in a not yet assembled condition. When assembled, the arms of the metal clamp are pressed together, so that the upper part of the metal clamp securely borders the head piece. In particular, the bends of the metal clamp then press on the edges, producing long-lasting tension if the plastic body is to be somewhat deformed by flow of material. In the case of a vehicle's interior lining, the result is no noise over a lengthy period.

A further advantageous embodiment consists in having the head piece configured at least partially as a roller shape. It is surrounded by the metal clamp at an angle which is greater than 180°, preferably 270°. By this means, holding forces are advantageously applied to the head piece.

Yet another embodiment of the invention makes provision for the ends of the stop springs to be bent inward at an angle which ensures sufficient holding forces, but nonetheless permits disassembly by pulling the attachment device out of the sheet.

Using another configuration of the invention, the hole in the sheet is sealed by having the plastic body, at an interval from the foot piece, carry a plate-shaped sealing disc, whose edge lies on the sheet in an assembled state.

The attachment device according to the invention can also be configured so that the middle piece of the plastic body has a double-T shaped cross section, with one cross piece and two end pieces, with the end pieces overlapping the head piece. Thus, a lateral guide for the metal clamp is formed. Preferably, provision is made that lugs project in the area of the stop spring's ends, which limit the swivel angle of the metal clamp.

SUMMARY OF THE INVENTION

In the area of the foot piece, the shaft preferably has a trapezoidal cross section, so that after insertion into a laterally open opening of the retainer, it locks there. The foot piece is preferably configured to be asymmetric, so that insertion into the retainer at a wrong angular position is impossible.

One exemplary embodiment of the invention is depicted in the drawing using several figures, and is described in greater detail in the following description.

For a full understanding of the present invention, reference should now be made to the following detailed description of the preferred embodiments of the invention as illustrated in the accompanying drawings.

DESCRIPTION OF THE PREFERRED EMBODIMENTS

Figure 2:
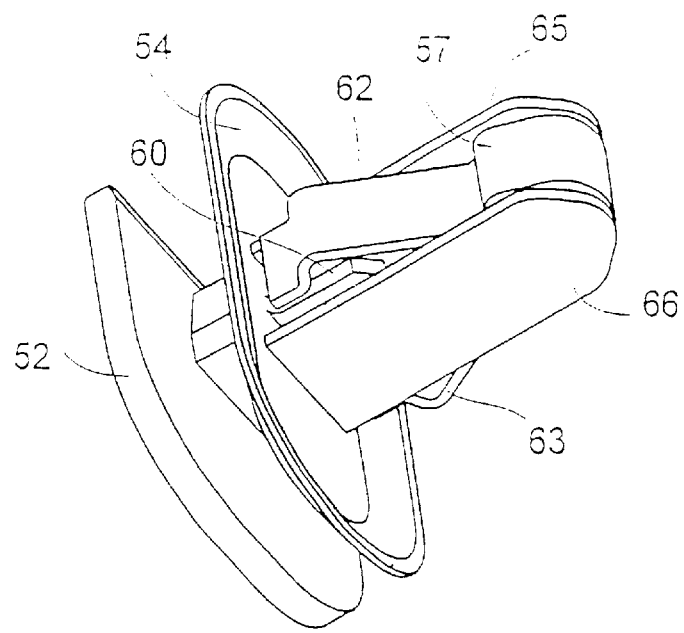
FIG. 2 is a perspective view of the complete attachment device according to the invention.
Figure 3:
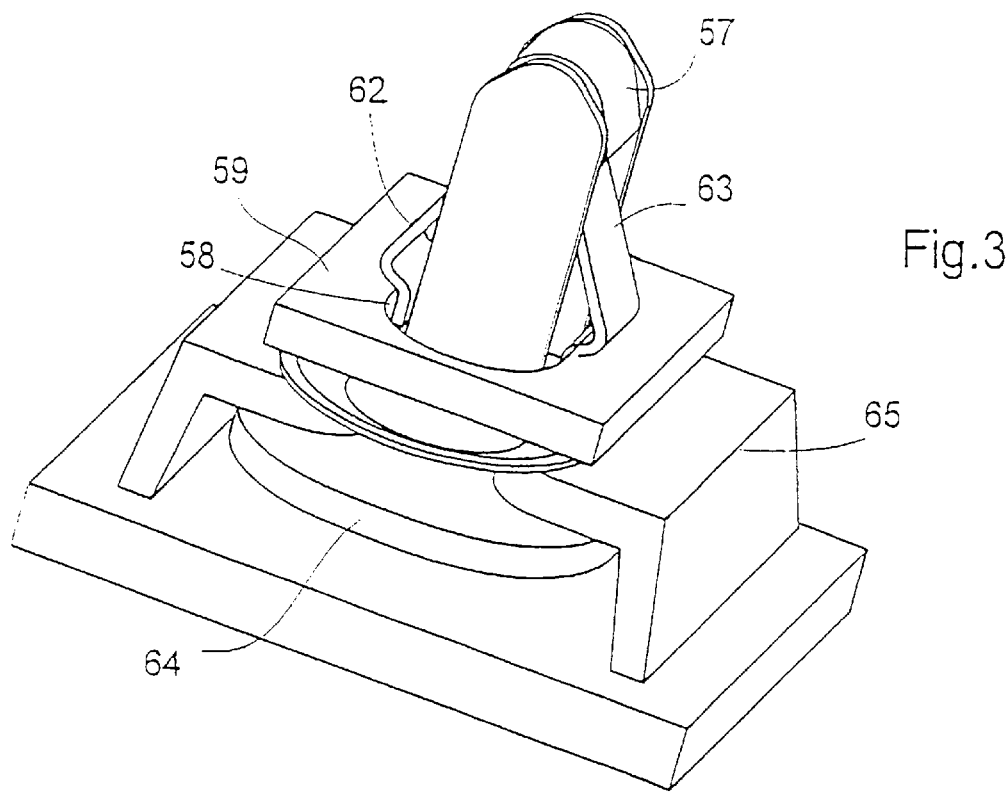
FIG. 3 is a perspective view of the assembled attachment device in which both the structural part (in particular, the plastic lining) and the sheet are depicted as rectangular cutouts.

The present invention will now be described with reference to FIGS. 1–3 of the drawings. Identical elements in the various figures are identified by the same reference numerals.

Figure 1A:
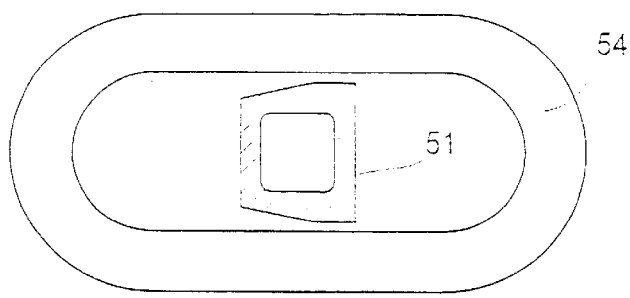
FIG. 1, comprised to FIGS. 1*a*, 1*b*, 1*c* and 1*d,* are four elevational and plan views of the plastic body of the attachment device according to the invention.
Figure 1B:
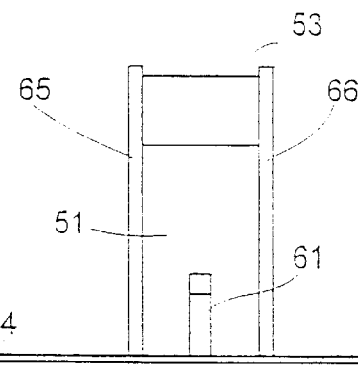
Figure 1C:
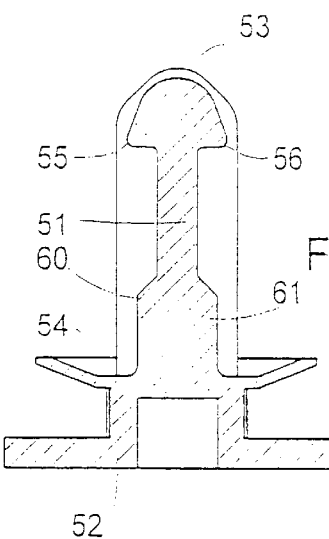
Figure 1D:
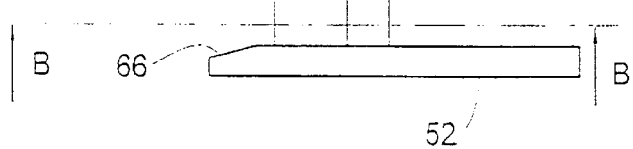
Figure 1D:
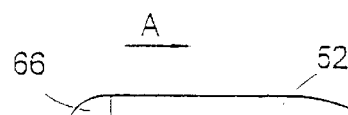

The plastic piece depicted in FIGS. 1a to 1d has a one-piece design consisting of a shaft 51, a foot piece 52, a head piece 53 and a sealing disk 54. The head piece 53 is shaped like a roller upward and tapers outward below, so that stops 55, 56 for the clamp 57 (FIGS. 2, 3) are formed. The clamps 57 pushed over head piece 53 can, in their non-tensioned state, make a tipping motion which facilitates pressing into the attachment hole 58 in sheet 59, even if the attachment device is held there slightly at a slant. The tipping motion of clamp 57 is in fact limited by ribs 60, 61 on shaft 51. Additionally, FIG. 1b shows cross section planes A—A and B—B for FIGS. 1a and 1c.

Middle piece (shaft) 51 and head piece 53 are limited by two end pieces 65, 66, which prevent clamp 57 from slipping off head piece 53.

The stop springs 62, 63 that are formed from the arms of clamp 57 are configured so that the sheet is securely clamped between stop springs 62, 63, and the sealing disk 54. The lower parts of stop springs 62, 63 are bent inward at an angle. On the one hand, this ensures that there will be sufficient holding force. On the other, it nevertheless makes it possible to disassemble by pulling the attachment device out of sheet 59.

Stop springs 62, 63, in particular, include an interval between the bent portions in the end sections and those which, when assembled, press against the contact surfaces 55, 56 of the head piece. These stop springs (62, 63) are configured so that, even if there is a gradual flow of the plastic body, sheet 59 remains securely tensioned, avoiding rattling noises.

Between sealing disk 54 and foot piece 52, the shaft is configured somewhat like a trapezoid. This facilitates insertion into the insertion opening 64 of retainer 65, which, for example, is tip-stretched on a plastic lining. In the assembled position, the plastic body locks with projections which are not visible in the illustrations. It is thus secured in retainer 65. Foot 52 is configured to be asymmetrical, so that it can be inserted only in the turning position provided for a secure stop in retainer 65. Angled shaping 66 facilitates insertion.

There has thus been shown and described a novel fixing element which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In an attachment device for connecting plastic parts, especially linings, to sheets, particularly body components of a motor vehicle, comprising of a plastic body with a foot part for insertion into a hoop-shaped holder of the plastic part and a head part, which, when assembled, projects through an opening in the sheet, said plastic body having a longitudinal axis, the improvement wherein a metal clamp (57) that adjoins the head part (53) is attached to the head part (53), said metal clamp having two arms which form a stop spring (62, 63) and extend at an acute angle to the longitudinal axis of the plastic body, with the arms (62, 63) gripping behind the edges of an opening (58) in a sheet (59) when in an assembled condition, and wherein the head part has projections (55, 56) and the arms clamp (57) have bent portions which grip behind the projections on a side of the head part (53) which faces the foot part (52).

2. Attachment device according to claim 1, wherein the head part (53) with the projections (55, 56) rests on a narrower middle part (51).

3. Attachment device according to claim 1, wherein the head part (53) is essentially a half cylinder shape and forms the contact surface for the metal clamp (57).

4. Attachment device according to claim 1, wherein the bent portions of the arms (62, 63) and the head part (53) are configured so that the metal clamp (57) is seated on the head part (53) so as to swivel.

5. Attachment device according to claim 1, wherein the head part is configured at least partially as a roller shape, and is surrounded by the metal clamp at an angle greater than 180°.

6. Attachment device according to claim 1, wherein the arms (62, 63) have ends that are bent inward at an angle which ensures sufficient holding force, but facilitates disassembly when pulling the attachment device out of the sheet.

7. Attachment device according to claim 1, wherein, distanced from the foot part (52), the plastic body has a plate-shaped sealing disc (54), whose edge, when assembled, touches the sheet (59).

8. Attachment device according to claim 1, wherein a middle part of the plastic body has a double-T-shaped cross section with a cross piece (51) and two end pieces (65, 66), with the end pieces (65, 66) projecting over the head part (53), thus forming a lateral guide for the metal clamp (57).

9. Attachment device according to claim 8, wherein lugs (60, 61) project from the cross piece, which limit a swivel angle of the metal clamp (57).

10. Attachment device according to claim 1, wherein the foot part (52) is shaped to be asymmetric.

11. Attachment device according to claim 1, wherein in the vicinity of the foot part (52), the plastic body is provided with an at least partially trapezoid-shaped cross section.

12. Attachment device according to claim 1, wherein the head part is configured at least partially as a roller shape, and is surrounded by the metal clamp at an angle of substantially 270°.

* * * * *